Patented June 26, 1934

1,964,011

UNITED STATES PATENT OFFICE 1,964,011

METHOD OF MAKING AND MARKETING SAUSAGE PRODUCTS

Charles H. Vogt, Philadelphia, Pa.

No Drawing. Application November 10, 1928, Serial No. 318,582

19 Claims. (Cl. 99—11)

The present invention relates to novel sausage products and processes of manufacturing and marketing the same.

More particularly the invention relates to sausage having an edible skin or membrane about the exterior surface thereof which has been formed by a combined chemical, physical and bacterial action in and of the protein and nitrogenous matter contained in the meat mixture of which the sausage is made, to the processes of forming such membrane or skin in the manufacture of such sausages, to the methods of preserving the same in desirable marketable condition for an indefinite period of time after manufacture and to novel methods of preparing the sausage for market.

In the ordinary methods in use of making sausage, particularly those of the Frankfurter type, the meat mixture consisting of beef, pork, spices, condiments and sometimes cereals, is stuffed into casings derived from the intestines of various animals. The intestines of all animals, however, are not adapted for use as casings in sausage manufacture, those of the sheep and hogs being the only ones that are suitable for such use. The casings derived from the intestines of sheep are employed for the higher grade of Frankfurters while those derived from the hog intestines are used for the lower grade of Frankfurters. Besides being objectionable because of their derivation, the demand for such casings far exceeds the supply. The scarcity of the most desirable casings makes the cost thereof almost prohibitive. This is due to the fact that a few organizations control the market for such casings.

The scarcity, cost, and disadvantages of suitable natural casings have long been recognized and various methods have been proposed whereby casingless sausages, or sausages not encased in the casings derived from the intestines of animals may be produced. The first known method is that disclosed in U. S. Patent to Boyle #1,009,953 which comprises forming the sausage by placing the meat mixture in a mold, submerging the sealed mold in a hot water bath, and heating for a short time to a temperature of 155° to 160° F. to effect a cooking of the external surface of the sausage in contact with the sides of the mold, and thereby produce a coating or thin crust of cooked meat thereon which is composed of the same material as the body of the sausage.

This process while long known has not met with commercial success due to the fact that the heating of the external surface of the sausage, as proposed in the aforementioned patent, causes the coagulation of the coagulable proteins and partial cooking of the remaining proteins ordinarily contained in the surface of the sausage meat in contact with the mold, and results in the formation of a crust or coating about the exterior surface of the sausage. The proteins normally present on the surface of the fresh meat mixture are generally not of the proper structure and, if present, are insufficient to form a smooth homogeneous protecting membrane or skin as such over the surface of the sausage, it having been determined that a satisfactory coating requires the presence of proteins and/or nitrogenous matter of a different and generally less complex structure than are normally present in the original fresh meat mixture.

This coating or crust above referred to has the disadvantages in that in practice it usually adheres to the walls of the mold and is broken as the sausages are being expelled therefrom, thereby leaving a rough uneven and unattractive surface. This coating is also of a coarse open texture, is irregular and uneven, and because of its non-homogenity permits of rapid bacterial decomposition of the sausage in the presence of moisture and the organisms commonly found in the air. Neither does such a coating simulate in appearance sausage encased in animal casings, nor does it possess the properties inherently present in casing sausages, and even, if marketed immediately after production, they do not find a ready market as the bacterial deterioration is very rapid. Due to the cooking of such surface of the sausage prior to smoking, the surface is of such a nature that a satisfactory smoke or cure is imparted thereto only with difficulty.

By this invention it is possible to produce sausage having a protective external membrane or skin thereon formed by the combined physical, chemical, and bacterial action of the protein and nitrogenous matter and fats normally contained in the meat mixture of which the sausage is made which simulate in appearance the ordinary casing sausage and possess substantially greater tensile strength and elasticity than the cooked crust or coating of the sausage produced according to the aforementioned United States patent.

Broadly stated, sausage according to this invention may be produced by forming the uncooked meat mixture of which the sausage is made into the desired shape and then subjecting the formed sausage to an apparently controlled physical, chemical, and bacterial action in and of the protein and nitrogenous matter of the sausage meat mixture, thereby effecting the formation of a protective membrane or skin containing substantial quantities of protein or nitrogenous matter of generally less complex structure than the proteins normally present in the fresh meat, about the exterior surface of the sausage. The uncooked sausage with an initial membrane or skin formed thereon are then subjected to a smoking operation to effect the usual curing of the product, and incidently not only partially sterilize the exterior surface of said membrane or skin but also reduce the active organisms which are about the exterior surface of said membrane or skin. This smoking action at the same time causes a toughening and strengthening of the protective membrane or skin.

The smoked sausage may then be inserted in suitable containers and cooked in the same at sterilizing temperatures in a manner similar to that usually followed in the canning of vegetables or they may be cooked, the surface of the membrane or skin so treated as to render it sterile, and then encased in individual wrappers.

Where the sausage are prepared for market by encasing same in individual wrappers, it is essential that the outer or exterior surfaces of the protective membrane or skin be substantially free from slime producing organisms and substantially free of excess moisture. It has been determined by exhaustive investigation that unless the outer or exterior surface of the protective membrane of the sausage be both substantially sterile and free from excess moisture, the sausage after a short period of time change color and a slime begins to form about the exterior surface thereof. Thus, the presence of moisture about the exterior surface of the protective membrane, and the nonsterility of said membrane, are contributing factors which combined form an environment conducive to the rapid propagation of the bacteria associated with or present in the sausage. Ten different species of organisms were isolated from samples taken in the raw and finished products which generally are of the kind whose growth and activities are inhibited by the action of light and by chilling. It was determined that the bacteria which caused this sliming and deteriorating action in the sausage do not occur naturally in the raw meat ingredients, but are chiefly skin bacteria or organisms present in the soil and atmosphere, and are usually found on the utensils used and on the skin of the workers and are transferred to the sausage in the course of manufacture through the medium of atmospheric contact, the utensils, hands and clothing of the workers. Such species of bacteria are chiefly spherical organisms, inhibited somewhat by the action of light.

It was also determined that the particular character of wrappers employed was a contributing factor in aiding or abetting this destructive action. By suitable experiments it was found that wrappers made of a material which is transparent to light, that is, would offer the least resistance to the rays of light, particularly the actinic rays, and which is not pervious to moisture due to the mutual solubility with fats and greases were particularly adapted for this purpose, and would inhibit the growth of the slime forming bacteria to the desired degree. The wrapping material should be light in weight, firm, and possess sufficient elasticity as to conform to and adhere to the outer surface of the sausage at substantially all points thereof, and to substantially seal it against the influences of the atmosphere.

It has been found that by properly controlling the production of my improved casingless sausage a high grade product is secured of uniform diameter and length which is admirably suited for canning purposes, and a protecting membrane or skin may be formed around the sausage which may be immersed in brine and heated to 240° F. or more and will hold the sausage together without permitting substantial loss of meat juices in the brine or disintegration of the sausage over comparatively long periods of time. The product secured in this way may be canned in brine at temperatures high enough to insure thorough sterilization in hermetically sealed cans, and in such manner that a partial vacuum is maintained in the can, giving a high grade meat product of superior flavor that may be removed from the cans in whole condition and will keep in excellent condition for long periods of time.

Accordingly, an object of this invention is the production of casingless sausage having a protective external membrane or skin thereon formed of a substantial percentage of nitrogenous or protein matter which simulates in appearance the ordinary casing sausage and possesses substantially greater tensile strength than the strength of a cooked crust of the sausage meat of equal thickness.

Another object of this invention is the production of casingless sausage having a protective external membrane or skin thereon formed by the combined physical, chemical and bacterial action on and of the nitrogenous or protein matter contained in the fresh meat mixture of which the sausage is made.

Another object of this invention resides in the provision of novel processes for making casingless sausage whereby a protective external membrane or skin is formed around the sausage containing substantial quantities of nitrogenous or protein matter of generally more simple structure than is normally contained in the fresh sausage meat.

Another object of this invention is to provide a novel process for making casingless sausage by which a protective membrane or skin is caused to be formed from the meat constituting the body of the sausage which protective membrane or skin comprises substantially more water soluble proteins than are present in the meat mixture.

A further object of the invention is the production of casingless sausage having a protective membrane or skin externally formed thereon from the protein or nitrogenous matter contained in the meat of which the sausage is made which may be heated by processes for canning at temperatures of 240° F. or more, without deleterious effects and in which the membrane will stand up satisfactorily when immersed in brine for canning purposes, and when wrapped individually for marketing.

A further object of the invention is the production of a casingless sausage having a protective external membrane thereon formed by the combined physical, chemical and bacterial action on the nitrogenous and protein matter of the meat mixture which are individually enclosed in a thin, transparent wrapper impervious to moisture and resistant to the action of the greases naturally contained in the sausage which wrapper adheres to the sausage closely to substantially seal the product from moisture and other damaging influences present in the atmosphere.

Still another object of this invention is the provision of a novel process for making sausage whereby the protein matter contained in the sausage forms a protective membrane or skin composed of protein matter and fats by the breaking down or partial breaking down and re-arrangement of the proteins and meat constituents naturally present in the fresh sausage meat mixture.

A further object of the invention resides in the provision of a novel process for making casingless sausage whereby the meat mixture is formed into sausage which are straight and substantially uniform in size and contour so as to permit the wrapping of the sausage in finished form in individual wrappers by automatic machinery or to be placed in containers having dimensions proportioned in accordance with the length and cross sectional area of the individual sausages so that the sausages may be canned without substantial voids between the can walls and the individual sausages whereby canning thereof may be effected without the use of artificial preservatives, or relatively large amounts of brine.

A still further object of the invention resides in the provision of a process for making casingless sausage whereby a protective membrane or skin is formed about the exterior surface thereof accompanied by the breaking down and rearrangement of the proteins and nitrogenous matter naturally present in the meat mixture of which the sausage is made, and in which the substantial sterilization of the skin or membrane formed around the sausage is brought about either in canning, or before or after insertion in suitable wrappers.

By way of example, sausage may be produced in accordance with this invention by proceeding in the following manner. A meat mixture is formed by mixing together beef and pork preferably in the ratio of 200 pounds of beef to 180 pounds of pork, and adding the usual spices and other common ingredients of sausage mixtures thereto. The mixture is then subjected to a disintegrating or chopping action, and comminuted to the required degree, and preferably to a comparatively fine state.

During the chopping or disintegration of the sausage mixture it is preferred to add a certain amount of water in the form of ice which should preferably be manufactured from sterile water to eliminate so far as possible contaminating bacteria that naturally appear in water. The addition of the ice serves the double function of initially reducing the temperature of the meat mixture, and supplying the mixture with water in addition to the natural moisture in the meat from which the mixture is formed.

The sausage mixture thus prepared is then stuffed or packed into molds of the desired size and shape. This may be done by the ordinary sausage stuffer or any of the other well-known elements designed for such purposes. The molds may be made of any construction but molds having smooth tubular bores of uniform diameter and length, made of aluminum, rust proof iron, nickel, or material of like character readily sterilized and free from uneveness to minimize contamination of meat when in contact therewith are preferably used. In place of tubular molds being employed in the step of preforming the sausage, molds which open lengthwise may be used if desired or the sausage may be stuffed into artificial casings and linked in uniform lengths. The tubular molds made of metal are, however, preferred. Whatever the construction of metallic molds employed may be, it is important that the interior surface of the molds be smooth and even in character.

The molds loaded with the sausage mixture are then transferred to a cooling chamber or space, or are passed through brine maintained at a suitable temperature, preferably from 0° F. to 48° F. The molds are retained in the cooling chamber for a period of time sufficient to permit the sausage to set to the form of the molds, preferably without freezing throughout so that they will retain their shape after being removed from the molds. The time required to cause setting of the sausage will depend upon the temperature of the cooling chamber or upon the initial temperature and condition of the meat mixture. By subjecting the sausage to a temperature of 0° F. a few minutes they are found to be shell frozen and in suitable set condition while when placed in the usual packing house chilling room the meat sets sufficiently in 2 to 24 hours time, at the expiration of which time the molds are removed from the cooling room, and in practice the sausage have been permitted to set in the cooler for as long as 48 hours or more.

The formed sausage which have been set to shape in the molds are then removed from the molds in any desired manner. If the formed sausage are in tubular molds, the sausage is ejected therefrom by means of plungers, and deposited or placed upon open mesh wire screens to facilitate the handling thereof during subsequent operations. The screens are provided with supporting wires parallelly disposed or other guides so arranged as to hold the adjacent sausage spaced apart the necessary distance for proper smoking to maintain the formed sausage straight without covering a substantial portion of the surface of the sausage and retaining the sausage between these guides intact during the subsequent operations. Unless the sausage is properly supported they tend to curl with the result that they either retard the wrapping or cannot be wrapped automatically.

The casingless sausage as they come from the molds generally have a smooth, glossy appearance, are fairly firm to the touch, and retain their form. During the chilling or cooling step, "setting" takes place, probably due partly to the solidification of the fat, and possibly due partly to a physical chemical change of the colloids.

The formed sausage supported upon the wire screens are then subjected to a vapor bath or subjected to a moist atmosphere at a temperature of 90° F. to 100° F. for from approximately three to ten minutes depending upon the thickness and texture of membrane desired, a heavier membrane being desirable for canning purposes in which immersion in brine is required. In long treatments a portion of the protein coating may be dissolved so that it should be understood that the thickness and texture of the coating is not directly proportional to the duration of said treament. During his step of the process of making the sausages, changes in the proteins due to bacterial and chemical action take place and the growth or formation of the skin or membrane on the sausage is caused to make some progress.

The screens containing the sausage are then immediately transferred to a closed compartment having steam radiating coils arranged in the bottom thereof. The closed compartment preferably comprises a baffle plate structure which is disposed directly above the steam coils together with a fan arrangement to blow a current of air or gas which has been passed through a filtering medium such as cotton held in place between screen plates for the purpose of removing dust particles and those bacterial contaminants normally present in air. The baffle plates are so arranged as to deflect the air upward and thus distribute the air current in an approximately uniform manner over the entire mass of sausage supported upon the screens. The wire screens supporting the sausage are placed in the closed chamber at a point above the baffle plate. The air circulating through the closed chamber is, preferably filtered and dry, and is maintained at a temperature of about 100° F. to 120° F. This air treatment of the sausage is continued for a period of about 3 minutes which may, however, be varied to vary the quality and texture of the skin. During this treatment partial dehydration of the surface occurs and a protective coating or membrane continues to form about the exterior surface of the individual sausage as a result of the physical, chemical and bacterial changes initiated in the vapor treatment stage. This protective membrane is apparently particularly the result of a combined physical, chemical and bacterial action in the protein or nitrogenous matter contained in the sausage adjacent to and at the exterior surface thereof. The bacterial action is believed to be due to the aerobic bacteria present in the atmosphere, while the chemical action probably consists in the oxidation and/or hydrolysis of the proteins, causing such proteins as are adjacent the surface of the meat mixture to break down into simpler compounds. The membrane or skin upon analysis shows the presence of amino acids evidencing protein oxidation. The air treatment also results in a partial removal or dehydration of the moisture contained in the sausage.

The screens supporting the formed sausage may then be transferred to cages and placed in an ordinary smoke-house wherein they are further dried while being smoked to the desired degree. Preferably, the smoking is so regulated that it begins at a temperature of approximately 110° F. to 120° F. and concludes when a temperature of approximately 165° F. or even higher, is reached. The smoking period, when carried out in the preferred manner, requires approximately from 2 to 4 hours, depending upon atmospheric conditions and the initial condition of the sausage. During the smoking process the protective membrane completely formed about the exterior surface of the sausage as just described is firmly fixed or set and is toughened to the desired degree, caused in part, it is believed, by the coagulation of water soluble proteins of the coating. Such coagulation begins at a temperature of 131° F. The membrane at this stage of the process may be made so as to closely resemble the sheep casing used in the high grade Frankfurter sausage as regards texture and appearance. The smoking also has a germicidal action on organisms of the species generally known as "Proteus" and found appearing naturally in the meat of the initial mixture, but does not kill the spherical skin organisms which cause sliming.

While it is preferred to subject the sausage after they have been ejected from the molds to a moisture treatment followed by an air treatment as above described prior to the smoking operation in order to promote advantageous bacterial growth, it is to be understood that sausage after ejection from the molds may be immediately subjected to the smoking operation, but when the membrane is to be formed during the smoking operation, the long smoking period is necessary.

The smoked sausage of uniform length and diameter may be canned or they may be suitably treated and then encased in individual wrappers made of a light, transparent material which is impervious to moisture, and unaffected by the action of greases. If it is desired to can the sausage having a skin or membrane made up of protein matter about the exterior surface thereof, such sausage after they have been smoked, are placed in suitable containers such as tin cans, glass jars, and the like which are of such size that six sausage may be tightly packed lengthwise into each can with one sausage in the center and five sausage packed tightly around the central sausage so that the can is substantially filled by the sausage. In this way, a minimum space or voids to be filled by brine exists in the cans, and it is found that accordingly effective sterilization of the central sausage without overcooking the outer sausage, may be secured, with minimum amount of brine being required, all of which is important in the successful canning of my improved sausage to prevent disintegration thereof, or injury thereto by over-cooking and to prevent loss of flavor due to absorption of meat juices by the presence of an excessive amount of brine.

Preferably, after the cans are filled with sausage they are heated to a temperature of 200° F. to 212° F. in a water or similar bath. The cans are filled while heated with hot brine for example a consommé of meat broth, and sealed. As the cans are cooled a partial vacuum is formed due to the contraction of the brine and air contained therein. As a result of this treatment, no injurious pressure is developed within the can when subsequently heated. Excessive pressure in the can would tend to cause rupture by virtue of pressure applied to the exterior of the skins or membranes. It is to be noted that each of my improved sausages has the imprint of the wires of the screen upon which they are supported, and in the indentations of the imprint the skin or membrane is thinnest so that in event internal pressures develop in the sausage the pressure escapes through the indentations or screen impressions and bursting of the sausage is avoided. This structure of my improved sausage also prevents undesirable bursting of the sausage in cooking operations in the process of manufacture for the sale of uncanned sausage as hereinafter set forth and in cooking operations by the consumer, and is an important feature of my invention.

A comparatively small amount of brine is required due to the fact that the sausage are of uniform shape, and when assembled in the cans or jars in the manner above pointed out substantially fill the space defined by the walls of said receptacles. The use of a comparatively small quantity of brine or consommé is also important because comparatively little of the meat flavor is absorbed thereby over long periods of time.

The filled cans or jars are closed and tightly sealed and before they are permitted to cool they are heated to a temperature sufficient to cause the sterilization of the sausage contained therein, and thereby kill all bacteria including those that cause sliming, it having been determined that the death point of the latter bacteria is at a temperature of about 194° F. maintained for 15 minutes or 212° F. for ten minutes. In order to effect this sterilization, the sealed cans or jars are heated to a temperature between 230° to 240° F. or higher for about 15 to 30 minutes this treatment being effective to thoroughly sterilize the product.

Owing to the nature of the membrane on the sausage, the heated cans or jars must then be suddenly chilled. The chilling is an important step of my canning process, as it prevents disintegration of the sausage, and sets the sausage in the cans or jars, thus enabling them to retain their shape, and quality indefinitely. The sudden chilling of the cans or jars causes the contraction of the pores of the membrane about the exterior surface of the sausage and a hardening of the greases about the outer surface of the sausage, thereby forming a seal which acts to prevent the egress of the meat juices contained in the sausages and the ingress of the brine into the sausage. The slight vacuum in the can formed as above stated insures the absence of pressures tending to force the brine in the sausages.

Sausage having a membrane or skin about the exterior surface thereof composed largely of protein matter when canned in this manner have a superior flavor, and suffer no deterioration over long periods. The heating of the cans or jars containing such sausage to a temperature of 240° F. results in the killing of any non-spore forming organisms commonly present in the Frankfurter mixture, and which may be present in or on the membrane without destroying the flavor of the sausage. Also, the heating of the cans containing the sausage to a temperature of 240° F. does not rupture the membranes of the sausage. This is desirable as by this method of canning it is possible to can sausage at sufficiently high temperatures without the use of artificial preservatives, such as sodium benzoate, and without sacrificing the flavor of the product.

Where it is desired to encase the sausage having a skin or membrane made up of protein matter about the exterior surface thereof in individual wrappers made of a light, transparent material which is impervious to moisture and unaffected by the action of greases, such sausage after they have been smoked are transferred while held in separate and straightened conditions by the guide wires of the screens to a cooker or cooking room and cooked for a period which may be from 10 to 15 minutes at temperatures between 194° F. and 212° F. the shorter time being sufficient at the higher temperature. The cooking is preferably carried out in an atmosphere of water vapor so that it contacts with each individual sausage, although other methods of cooking may be employed, if desired. In such cases, the cooking is started at a temperature of about 170° F. and the temperature gradually increased so that during the latter part of cooking the temperature is approximately from 194° F. to 200° F. for the purpose of killing the spherical non-spore forming organisms not killed in the smoking process. It has been found that such type of bacteria cause the sliming effect on the sausage, and that the thermal death point of these bacteria which also include the skin organisms is below the aforementioned temperatures for these lengths of exposures. The cooking of the sausage further toughens and increases the tensile strength of the protective membrane formed about the exterior surface of the individual sausage. The uniform spacing of the individual sausage and subjecting them so spaced to a cooking atmosphere, permits uniform treatment of each sausage, thus insuring effective sterilization action and destruction to spherical organisms in a minimum of time and at minimum temperatures.

In the process wherein the sausage are prepared for enclosing same in individual wrappers, it is to be noted that the treatment of the preformed sausage, that is from the time the sausage have been ejected from the molds on to the wire supporting screens up to and inclusive of the cooking steps, involves the maintenance of substantially uniform separation or spacing of the individual sausage, and the subjection of the sausage to uniform treatment at progressively increasing temperatures. This is very desirable as the best meat products are obtained when alternate high and low temperatures are avoided. It is to be furthermore noted that the treatment up to the time of the smoking is such as to promote the growth of organisms, particularly on the surface of the sausage, and to increase the membrane forming bacteria present, while beginning with the smoking, the treatment is such as to progressively inhibit and decrease the growth of organisms and bacterial activity.

After the sausage have been cooked they may be immediately transferred on the screens to a cooling room or chamber and cooled by subjecting same to currents of dry cool air or gases, or they may be subjected to a chilling with a tepid spray of water followed by an air drying treatment as desired. Where the cooked sausage are subjected to the latter procedure, they may be chilled by causing a tepid spray of water, preferably sterile water, to play upon the thus cooked sausage supported upon the wire screens. The chilling of the cooked sausage by means of a tepid spray of water causes the outer pores of the sausage to contract and also tends to effect a hardening of the greases about the surface of the sausage, thereby restricting the escape of moisture and meat juices contained in the interior of the sausage, and preventing loss of flavor of the product.

The tepid spray of water may, if desired, contain a suitable germicide such for example a weak solution of sodium hypochlorite such as 1.0 to 2.5% solution made from an original solution of sodium hypochlorite, containing 2.5 parts of available chlorine, for example, of about 2.5% strength. The sodium hypochlorite is a germicide and decomposes readily into sodium chloride. Upon decomposition of the hypochlorite, sodium chloride or common salt results. By the use of a spray of such a solution it is possible to render the outer surface of the membrane of the sausage more nearly sterile than is possible with pure water. Also, the salt or sodium chloride which is present about and on the surface of the sausage by the decomposition of the hypochlorite acts as a preservative for the sausage and assists in keeping same in a substantially sterile condition in addition to giving flavor to the product.

The cooked sausage after they have been chilled with a tepid spray of water or water containing a germicide or agent destructive to the organisms, may be immediately encased in individual wrappers made of a material which is transparent, and impervious to moisture and greases or they may be subjected to a moisture removing treatment and then wrapped, or they may be subjected to a moisture removing treatment, cooled and then wrapped.

The moisture removing treatment comprises exposing the sausage for a short time, for example 1 or 2 minutes, to a current of warm, dry and preferably sterilized or filtered air or gas. This dehydrating treatment is preferably carried out by transferring the screens carrying the sausage into a closed chamber through which a current of warm filtered air or gas is caused to circulate. This drying is for the purpose of removing the moisture which is present about or on the exterior surface of the sausage without removing or driving off any considerable portion of the moisture contained in the interior of the sausage. The effect of this treatment is to decrease the liability to bacterial increase.

If it is desired to subject the sausage after they have had the moisture removing treatment thus described, to a cooling treatment, such treatment consists in transferring the sausage on the screens to a chilling room through which a current of dry filtered and substantially sterile air or gas is caused to circulate at a temperature of 26° F. to 28° F.

The sausage after being subjected to one or both treatments above described are then encased in individual wrappers. The wrappers employed for this purpose should be made of a material which is transparent, and impervious to moisture and the action of greases. It should be light in weight, firm, and possess sufficient elasticity as to adhere to the outer surface of the sausage, and to substantially seal it against the influences of the atmosphere. The wrappers most suitable for this purpose are those made of a material marketed under the trade-name "Cellophane". These wrappers give the finished sausage an attractive appearance.

The skin or membrane formed on the sausage in carrying out the processes as above set forth initially simulates in appearance the animal casing ordinarily used on Frankfurters and sausages but differs materially from animal casings in that it is wholly edible, more readily digestible and has a high food value, and when exposed to air the skin or membrane rapidly changes form, becoming darker and tougher. My improved sausage must, therefore, be specially handled in order to permit the practical marketing thereof, as in ordinary atmosphere the sausage rapidly dry out and toughen, hence becoming unsuitable for marketing, unless they are kept cold. If a light membrane is formed initially, and the sausage are kept cold, the skin will upon exposure to air become slightly tougher and darker, gradually changing to the desired condition for marketing.

After the sausage are wrapped, they are put on screens in single layers and subjected to a temperature of 240° F. for about three minutes. This treatment is for the purpose of driving off the moisture about the surfaces of the sausage, and incidently produce a decrease in the number of organisms present thus increasing the keeping properties of the sausage. The presence of moisture causes the sausage to deteriorate rapidly due to the growth of organisms producing slimes and generally facilitating the bacterial decomposition of the sausage. The wrappers in which the sausage are encased are sufficiently porous to permit the escape of the moisture present through them during the heating, and yet exclude the air and moisture of the atmosphere therefrom to such an extent that the harmful propagation of the bacteria which may be associated with the sausage is prevented.

After this treatment the wrapped sausage are packed into boxes. In packing the sausage the workers doing this work are required to sterilize their hands continually by dipping them in a weak solution of sodium hypochlorite and then thoroughly drying them on clean sanitary paper towels before touching the sausage. This treatment is necessary in order that the exterior surfaces of the wrappers be maintained in a reasonably sterile condition.

After the sausage have been packed in boxes, the boxes are placed in a refrigerator. They are then ready for market. Every effort is made to prevent the condensation or precipitation of moisture on the sausage.

In an endeavor to determine the composition of the protective membrane formed about the exterior surface of casingless sausage manufactured in the manner above described as well as the cause of its formation, exhaustive investigations have been made, the results of which indicate that the membrane is formed by the probable breaking down of the proteins, nitrogenous and like compounds contained in the meat into simpler compounds, and indicate that the material for a suitable skin or membrane may possibly be formed independently of but from the sausage meat and subsequently applied to the molded sausage by dipping or spraying or like operations, and such methods of forming my improved product are contemplated as within the scope of my invention.

Analyses show an increase in the water soluble proteins (serums, gelatin, proteoses, etc.) in the newly formed membrane before smoking over those present in the raw untreated meat mixture. By way of example, in one set of analyses about 15 percent of water soluble proteins was found in the freshly comminuted meat mixture, while in the membrane before smoking 21.5 percent water soluble proteins were found. A change in the character of these water soluble proteins towards the point of simpler compounds was indicated as follows. In the original comminuted meat about 6.53 percent of proteoses based upon the total protein content was found, whereas in the analyzed newly formed unsmoked membrane about 16.43 percent was found. The water soluble coagulable proteins in the analyzed samples did not decrease in proportion to the increase of the proteose proteins and this distinctly points to a change in the structure of the proteins and which, of course, means a change in the properties and this change indicates probably hydrolysis of the protein molecules, and that the coating or membrane comprises hydrolyzed proteins. It is to be understood, however, that the analyses given are for a particular product and that the percentages and proportions may vary widely in my improved product depending upon the initial mixture, its condition, and the particular method of treatment and surrounding conditions during the skin formation, without departing from the spirit of my invention.

The smooth, tough, elastic skin formed about the exterior surface of the sausage according to this invention, is produced or may be produced as the result of a combined physical, bacterial and chemical action in a moist atmosphere containing an oxidizing element or oxygen containing compound with or without the simultaneous production of amino acids. The characteristics of the skin are its smoothness, elasticity, and tensile strength and the gradual and final, partial or complete disappearance of the individual outline of the meaty fibers to give place to a homogeneous whole acting as a protective coating to the formed sausage, and which is distinctly and physically separable from the interior of the sausage. The evenness and smoothness of the membrane are apparently accompanied by an increase in the water soluble proteins through hydrolysis, or other chemical or bacterial action, and certain proteose proteins produced during the hydrolysis are apparently essential in the formation of the membrane. Furthermore, the membrane of the smoked Frankfurter is apparently fixed by the process of smoking, which coagulates the coagulable water soluble proteins and "sets" the other proteins present, and is apparently further set and toughened by proper cooking, and exposure to air after cooking.

The skin or membrane formed about the exterior surface of the sausage is separable as a whole or in sections of substantial size from the sausage prior to the cooking operation. It is continuous and homogeneous, and resembles the casing derived from the intestines of sheep in appearance. Such skin or membrane contains an average of more than 2.8 percent of proteoses determined on a moisture free and fat free basis by the method of the Association of Official Agriculture Chemists. Ordinarily, the percentage of proteoses contained in the membrane or skin lies between approximately 4 and 16% of the total protein content on a water free fat free basis. The percentage of proteoses present in the skin or membrane apparently increases in proportion to length of time of treatment. In producing this skin or membrane about the surfaces of the sausage in accordance with the processes of this invention wide variations in time of treatment may occur during the formation of the skin or membrane with corresponding variations in the percentage of proteoses present in the formed membrane.

The crust or coating of the sausage produced by the process of U. S. Patent No. 1,009,953, referred to hereinabove, contains an average of less than 2.8 percent of proteoses determined on a moisture free and fat free basis by the method of the Association of Official Agriculture Chemists. This crust or coating can be separated from the sausage only with great difficulty, and will not peel off in sections of any substantial size. It is discontinuous, non-homogeneous, and rough in appearance.

It has been determined that the skin or membrane formed about the exterior surface of the sausage by a combined chemical and bacterial action on the protein and nitrogenous matter contained in the meat mixture of which the sausage is made, should be conditioned in such manner as to remove the free moisture about the external surface of the skin or membrane before the sausage are individually wrapped in suitable wrappers. Further, the sausage themselves should be cooked in such manner as to kill or destroy any of the slime forming bacteria which may be associated with the sausage. Also, the wrappers in which the sausage are enclosed and tightly sealed against the influences of the atmosphere should be made of a material which is transparent, impervious to moisture, resistant to the action of greases and meat juices, and should not be mutually soluble with the meat juices and greases, possess sufficient elasticity and tensile strength to adhere firmly to the sausage. Sausage treated in such manner as to control or substantially eliminate the factors which contribute to the impairment of the marketability of casingless sausage have been found to show no destructive or deteriorating action over long periods.

By care in sterilization of the utensils and apparatus, and in the handling of the material, the introduction of spore forming organisms may be avoided, and the non-spore forming organisms may be sterilized and killed in the manufacturing procedure producing a substantially sterile product which should be carefully handled in the chilling and wrapping stages to avoid re-inoculation of the product by compelling workers to use substantially sterile gloves and clothing.

The sausage having this protective membrane formed thereon, should be cooked in such manner that at the last stage of the cooking period, the temperature should be approximately 194° F. or more for a period of time sufficient to produce death of the spherical organisms that cause the sliming action. For canning purposes, a thicker skin or membrane may be produced than is desirable when the sausage are to be marketed in individual wrappers.

After the cooking of the sausage, it is important that the sausage to be marketed in wrappers be dehydrated in such manner as to remove substantially all free moisture that has collected upon and about the exterior surface of the protective membrane or skin. This may be accomplished by drying the cooked sausage, that is, subjecting the cooked sausage to a drying in air or gaseous atmosphere sufficient only to remove the free or excess moisture which has collected about the exterior surface of the skin or membrane. This drying of the outer surface of the protective membrane or skin of the sausage is for the purpose of materially lessening the incidence to bacterial growth of all kinds. The degree of sterilization may be considerably improved if the cooked sausage are subjected to a chilling by causing a tepid spray of sterile water or water containing a germicidal agent to play upon the sausage and then immediately subjecting the sausage chilled in this manner to a drying in the manner above pointed out.

It has been found that the membrane of skin of the sausage is rendered more resistant to the destructive action of the slime producing bacteria if the membrane or skin has been impregnated with a chemical having germicidal properties. For example, if the cooked sausage are chilled by means of a tepid spray of water containing a weak solution of sodium hypochlorite, that is, a hypochlorite solution of 1.0 to 2.5% concentration made from an original solution of sodium hypochlorite containing 2½ parts of available chlorine, and immediately dried by subjecting them to a current of dry air, the drying being carried out in such manner that only the moisture which has been collected about or on the exterior surface of the membrane or skin is expelled, the skin or membrane is not only preserved but is also in better condition for resisting the action of the sliming bacteria.

Although it is essential that the outer surface of the membrane or skin formed about the sausage be sterile or practically so, and substantially free of excess moisture before the sausage are individually encased in suitable wrappers in order to control or restrict the action of the sliming bacteria, present in the sausage, it is also important that the wrappers utilized for such purpose be substantially sterile and such that the material of which they are made is transparent, substantially impervious to moisture, and resistant to the action of and not mutually soluble with fats and greases, and further that the wrapping be performed in a room in which the air is substantially dry and clean. In other words, the wrapping of the sausage should be carried out in such manner that moisture is excluded insofar as it is possible. Wrappers which are transparent to the actinic light rays have been selected in order to inhibit the propagation of slime forming organisms if any be present in the sausage as it has been determined that the growth of such organisms is inhibited by the action of light. Wrappers made of a material known as "Cellophane" possess the desired properties.

This application is a continuation in part of my co-pending applications Serial No. 218,113, filed September 7, 1927, and Serial No. 267,131, filed April 3, 1928.

Having thus described the invention, what is claimed as new and desired to be secured by Letters Patent is:

1. An article of manufacture comprising a sausage having a protective membrane formed from the meat of the sausage and composed largely of protein matter and fats, said membrane being smooth in appearance, elastic, and of sufficient strength and toughness and of a structure that will withstand processing temperatures of 230° F. or higher without bursting.

2. In the process of providing an uncured sausage with a protective membrane, the steps which comprise forming the uncooked sausage, and partially hydrolyzing the protein matter adjacent and at the surface of the uncooked sausage in an oxidizing medium at a temperature below the coagulating temperature of the coagulable albumin present to form a protective membrane about the exterior surface thereof.

3. In the process of providing an uncured sausage with a protective membrane, the steps which comprise forming the meat mixture into sausage of the desired shape, and breaking down the protein matter in the sausage in contact with an oxidizing medium at a relatively low temperature in such manner as to promote the formation of a protective membrane about the exterior surface of the shaped meat mixture without substantial coagulation of the albumins present.

4. In the process of making sausage, the steps which comprise comminuting the meat mixture, forming the meat mixture into sausage of the desired shape, and partially or completely hydrolyzing the protein matter adjacent and at the surface of the sausage in an extraneous oxidizing medium the temperature not in excess of approximately 120° F. to form a protective membrane about the exterior surface of the shaped meat mixture.

5. The process of making sausage which includes comminuting the meat mixture, confining the meat mixture in a container of a predetermined shape to form a sausage, and chilling the sausage thus formed to set the mixture and to also initiate the formation of a protective surface about the exterior of the shaped sausage.

6. The process of making sausage which comprises comminuting the meat mixture, confining the meat mixture in a container of a predetermined shape to form a sausage, chilling the sausage to set the mixture so that it may be removed substantially intact from said container and to initiate the formation of a protective surface about the exterior of the shaped sausage, and smoking the sausage to effect the formation and toughening of a protective membrane.

7. The process of making sausage which comprises comminuting the meat mixture, confining the meat mixture in a container of a predetermined shape to form a sausage, chilling the sausage to initiate the formation of a protective surface about the exterior of the sausage, removing the sausage from the container and exposing substantially the entire surface of the thus treated sausage to the atmosphere to cause bacterial action to set in to cause the formation of a protective membrane.

8. The process of making sausage which comprises comminuting the meat mixture, confining the meat mixture in a container of a predetermined shape to form a sausage, chilling the sausage while confined in said container to initiate the formation of a protective surface about the exterior of the sausage, exposing substantially the entire surface of the thus formed sausage to the atmosphere to cause bacterial and chemical action to set in to cause the formation of a protective membrane, and smoking the sausage to effect a toughening of the thus formed protective membrane.

9. The process of making sausage which comprises comminuting the meat mixture, confining the meat mixture in a container of a predetermined shape to form a sausage, cooling the sausage while confined in said container at a temperature of 0° to 48° F. to harden and to form a protective layer on said sausage to permit it to be removed intact from the container, removing the sausage from the container and exposing the thus treated sausage to the atmosphere for several minutes to cause the formation or growth of said protective membrane as a result of chemical and bacterial action, smoking the sausage to effect a toughening of the thus formed protective membrane, and cooking the thus formed sausage.

10. The process of making sausage which comprises confining a meat mixture in a mold of a predetermined size to form a sausage, cooling the sausage to set it to the form of the mold, removing the set sausage from the mold and exposing the thus treated sausage to moisture and to air currents to form a protective membrane thereon, smoking the sausage, and cooking the smoked sausage at a temperature of at least 194° F., and chilling the cooked sausage.

11. The process of making sausage which comprises confining a meat mixture in molds of a predetermined size to form uniform sausage, chilling the sausage in the molds to set them to the shape of the molds; removing the set sausage from the molds, exposing the molded surfaces of the removed sausage to moisture and air in a manner to form a protective membrane thereon; then successively smoking the sausage, cooking the smoked sausage, and chilling the cooked sausage.

12. An article of manufacture comprising a sausage having a homogeneous protective membrane formed from the meat of the sausage and composed largely of protein matter and fats, said membrane being smooth in appearance and provided with predetermined regular sections of less thickness than the remaining sections whereby internal pressures in the sausage may be relieved without causing undesirable bursting thereof.

13. In the process of making sausage, the steps which comprise comminuting the meat mixture, incorporating water into the meat mixture, forming the meat mixture into sausage of the desired shape, and hydrolyzing the protein matter in the sausage subjecting its exposed surface to an extraneous oxidizing medium to form a protective membrane about the exterior surface thereof at a temperature substantially below the searing temperature of the meat mixture.

14. The process of making sausage which comprises comminuting the meat mixture, incorporating water into the meat mixture, confining the meat mixture in a container of a predetermined shape to form a sausage, cooling the sausage while confined in said container to set the meat mixture, exposing the thus treated sausage to an atmosphere to cause formation of a protective membrane, smoking the sausage to effect a toughening of the thus formed protective membrane, and cooking the thus formed sausage.

15. The process of making sausages having a protective coating formed from the meat mixture from which the sausage is made, which comprises molding the meat mixture in the form of a sausage of the desired shape, removing the formed sausage from the mold to expose its molded surfaces, and subjecting said surfaces to the action of a gaseous medium maintained at a temperature of approximately 120° F. or less to form a protective membrane as a result of physical chemical and/or bacterial action on the meat forming said surfaces.

16. The process of making sausages having a protective coating formed from the meat mixture from which the sausage is made, which comprises molding the meat mixture in the form of a sausage of the desired shape, removing the formed sausage from the mold to expose its molded surfaces, subjecting said surfaces to the action of a gaseous medium maintained at a temperature of approximately 120° F. or less to form a protective membrane as a result of physical chemical and/or bacterial action on the meat forming said surfaces, and smoking the sausages to effect a toughening of the thus formed protective membrane.

17. The process of making sausage which comprises comminuting the meat mixture, incorporating water into the meat mixture, confining the meat mixture in a container of a predetermined shape to form a sausage, removing the sausage from the container exposing it to the air at a temperature of approximately 120° F. or less to form a protective membrane about the exterior surface of the sausage.

18. The process of making sausage which comprises comminuting the meat mixture, incorporating water into the meat mixture, confining the meat mixture in a container of a predetermined shape to form a sausage, removing the sausage from the container and exposing it to the air at a temperature of about 120° F. or less to form a protective membrane about the exterior surface of the sausage, and exposing the thus treated sausage to higher temperatures to toughen said protective membrane.

19. The process of making sausage which comprises comminuting the meat mixture, incorporating water into the meat mixture, confining the meat mixture in a container of a predetermined shape to form a sausage, cooling the sausage while confined in said container to permit the sausage to be removed from the container without rupture of its surfaces, exposing the thus treated sausage to the air to form a protective membrane, and smoking the sausage to effect a toughening of the thus formed protective membrane.

CHARLES H. VOGT.